(12) United States Patent
Lin et al.

(10) Patent No.: US 12,032,264 B2
(45) Date of Patent: *Jul. 9, 2024

(54) ELECTRO-OPTIC DISPLAYS

(71) Applicant: E INK CORPORATION, Billerica, MA (US)

(72) Inventors: Craig Lin, Fremont, CA (US); Haiyan Gu, Fremont, CA (US)

(73) Assignee: E INK CORPORATION, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,802

(22) Filed: Dec. 1, 2022

(65) Prior Publication Data

US 2023/0089428 A1   Mar. 23, 2023

Related U.S. Application Data

(63) Continuation of application No. 16/729,567, filed on Dec. 30, 2019, now Pat. No. 11,537,024.

(60) Provisional application No. 62/786,437, filed on Dec. 30, 2018.

(51) Int. Cl.
*G02F 1/1685* (2019.01)
*G02F 1/167* (2019.01)

(52) U.S. Cl.
CPC ............ *G02F 1/1685* (2019.01); *G02F 1/167* (2013.01); *G02F 2203/30* (2013.01)

(58) Field of Classification Search
CPC .... G02F 1/1685; G02F 1/167; G02F 2203/30; G02F 1/16766; G09G 2300/043; G09G 2320/0219; G09G 3/344; G09G 2310/068
See application file for complete search history.

(56) References Cited

U.S. PATENT DOCUMENTS

| | | |
|---|---|---|
| 6,124,851 A | 9/2000 | Jacobson |
| 6,130,773 A | 10/2000 | Jacobson et al. |
| 6,177,921 B1 | 1/2001 | Comiskey et al. |
| 6,232,950 B1 | 5/2001 | Albert et al. |
| 6,241,921 B1 | 6/2001 | Jacobson et al. |
| 6,252,564 B1 | 6/2001 | Albert et al. |
| 6,312,304 B1 | 11/2001 | Duthaler et al. |
| 6,312,971 B1 | 11/2001 | Amundson et al. |

(Continued)

FOREIGN PATENT DOCUMENTS

| | | |
|---|---|---|
| CN | 110010080 A | 7/2019 |
| CN | 112017599 A | 12/2020 |

(Continued)

OTHER PUBLICATIONS

Korean Intellectual Property Office, PCT/US2019/068874, International Search Report and Written Opinion, Apr. 23, 2020. Apr. 23, 2020.

(Continued)

*Primary Examiner* — Amit Chatly

(74) *Attorney, Agent, or Firm* — Jason P. Colangelo

(57) ABSTRACT

A method for driving an electro-optic display, the display having at least one display pixel coupled to a storage capacitor, the method include applying a waveform sequence to the at least one display pixel and connecting the storage capacitor to a first bias voltage, and maintaining a last frame voltage level on the display pixel after the completion of the applied waveform.

6 Claims, 10 Drawing Sheets

(56) References Cited

U.S. PATENT DOCUMENTS

| | | |
|---|---|---|
| 6,376,828 B1 | 4/2002 | Comiskey |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,480,182 B2 | 11/2002 | Turner et al. |
| 6,498,114 B1 | 12/2002 | Amundson et al. |
| 6,506,438 B2 | 1/2003 | Duthaler et al. |
| 6,518,949 B2 | 2/2003 | Drzaic |
| 6,521,489 B2 | 2/2003 | Duthaler et al. |
| 6,535,197 B1 | 3/2003 | Comiskey et al. |
| 6,545,291 B1 | 4/2003 | Amundson et al. |
| 6,639,578 B1 | 10/2003 | Comiskey et al. |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,724,519 B1 | 4/2004 | Comiskey et al. |
| 6,750,473 B2 | 6/2004 | Amundson et al. |
| 6,788,449 B2 | 9/2004 | Liang et al. |
| 6,816,147 B2 | 11/2004 | Albert |
| 6,819,471 B2 | 11/2004 | Amundson et al. |
| 6,825,068 B2 | 11/2004 | Denis et al. |
| 6,831,769 B2 | 12/2004 | Holman et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,865,010 B2 | 3/2005 | Duthaler et al. |
| 6,866,760 B2 | 3/2005 | Paolini, Jr. et al. |
| 6,873,452 B2 | 3/2005 | Tseng et al. |
| 6,909,532 B2 | 6/2005 | Chung et al. |
| 6,922,276 B2 | 7/2005 | Zhang et al. |
| 6,967,640 B2 | 11/2005 | Albert et al. |
| 6,980,196 B1 | 12/2005 | Turner et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,012,735 B2 | 3/2006 | Honeyman |
| 7,030,412 B1 | 4/2006 | Drzaic et al. |
| 7,072,095 B2 | 7/2006 | Liang et al. |
| 7,075,502 B1 | 7/2006 | Drzaic et al. |
| 7,075,703 B2 | 7/2006 | O'Neil et al. |
| 7,106,281 B2 | 9/2006 | Kim et al. |
| 7,106,296 B1 | 9/2006 | Jacobson |
| 7,110,163 B2 | 9/2006 | Webber et al. |
| 7,116,318 B2 | 10/2006 | Amundson et al. |
| 7,119,772 B2 | 10/2006 | Amundson et al. |
| 7,144,942 B2 | 12/2006 | Zang et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,190,008 B2 | 3/2007 | Amundson et al. |
| 7,206,119 B2 | 4/2007 | Honeyman et al. |
| 7,223,672 B2 | 5/2007 | Kazlas et al. |
| 7,230,751 B2 | 6/2007 | Whitesides et al. |
| 7,256,766 B2 | 8/2007 | Albert et al. |
| 7,259,744 B2 | 8/2007 | Arango et al. |
| 7,280,094 B2 | 10/2007 | Albert |
| 7,301,693 B2 | 11/2007 | Chaug et al. |
| 7,304,780 B2 | 12/2007 | Liu et al. |
| 7,312,784 B2 | 12/2007 | Baucom et al. |
| 7,327,346 B2 | 2/2008 | Chung et al. |
| 7,327,511 B2 | 2/2008 | Whitesides et al. |
| 7,347,957 B2 | 3/2008 | Wu et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,382,363 B2 | 6/2008 | Albert et al. |
| 7,388,572 B2 | 6/2008 | Duthaler et al. |
| 7,401,758 B2 | 7/2008 | Liang et al. |
| 7,411,719 B2 | 8/2008 | Paolini, Jr. et al. |
| 7,442,587 B2 | 10/2008 | Amundson et al. |
| 7,453,445 B2 | 11/2008 | Amundson |
| 7,492,497 B2 | 2/2009 | Paolini, Jr. et al. |
| 7,535,624 B2 | 5/2009 | Amundson et al. |
| 7,551,346 B2 | 6/2009 | Fazel et al. |
| 7,554,712 B2 | 6/2009 | Patry et al. |
| 7,560,004 B2 | 7/2009 | Pereira et al. |
| 7,583,427 B2 | 9/2009 | Danner et al. |
| 7,598,173 B2 | 10/2009 | Ritenour et al. |
| 7,605,799 B2 | 10/2009 | Amundson et al. |
| 7,636,191 B2 | 12/2009 | Duthaler et al. |
| 7,649,674 B2 | 1/2010 | Danner et al. |
| 7,667,886 B2 | 2/2010 | Danner et al. |
| 7,672,040 B2 | 3/2010 | Sohn et al. |
| 7,679,814 B2 | 3/2010 | Paolini, Jr. et al. |
| 7,688,497 B2 | 3/2010 | Danner et al. |
| 7,715,088 B2 | 5/2010 | Liang et al. |
| 7,733,335 B2 | 6/2010 | Zehner et al. |
| 7,785,988 B2 | 8/2010 | Amundson et al. |
| 7,830,592 B1 | 11/2010 | Sprague et al. |
| 7,839,564 B2 | 11/2010 | Whitesides et al. |
| 7,843,626 B2 | 11/2010 | Amundson et al. |
| 7,859,637 B2 | 12/2010 | Amundson et al. |
| 7,872,633 B2 | 1/2011 | Zhou et al. |
| 7,880,958 B2 | 2/2011 | Zang et al. |
| 7,893,435 B2 | 2/2011 | Kazlas et al. |
| 7,898,717 B2 | 3/2011 | Patry et al. |
| 7,905,977 B2 | 3/2011 | Qi et al. |
| 7,957,053 B2 | 6/2011 | Honeyman et al. |
| 7,986,450 B2 | 7/2011 | Cao et al. |
| 8,009,344 B2 | 8/2011 | Danner et al. |
| 8,009,348 B2 | 8/2011 | Zehner et al. |
| 8,027,081 B2 | 9/2011 | Danner et al. |
| 8,049,947 B2 | 11/2011 | Danner et al. |
| 8,072,675 B2 | 12/2011 | Lin et al. |
| 8,077,141 B2 | 12/2011 | Duthaler et al. |
| 8,089,453 B2 | 1/2012 | Comiskey et al. |
| 8,120,836 B2 | 2/2012 | Lin et al. |
| 8,159,636 B2 | 4/2012 | Sun et al. |
| 8,208,193 B2 | 6/2012 | Patry et al. |
| 8,237,892 B1 | 8/2012 | Sprague et al. |
| 8,238,021 B2 | 8/2012 | Sprague et al. |
| 8,362,488 B2 | 1/2013 | Chaug et al. |
| 8,373,211 B2 | 2/2013 | Amundson et al. |
| 8,389,381 B2 | 3/2013 | Amundson et al. |
| 8,395,836 B2 | 3/2013 | Lin |
| 8,437,069 B2 | 5/2013 | Lin |
| 8,441,414 B2 | 5/2013 | Lin |
| 8,456,589 B1 | 6/2013 | Sprague et al. |
| 8,498,042 B2 | 7/2013 | Danner et al. |
| 8,514,168 B2 | 8/2013 | Chung et al. |
| 8,547,628 B2 | 10/2013 | Wu et al. |
| 8,576,162 B2 | 11/2013 | Kang |
| 8,610,988 B2 | 12/2013 | Zehner et al. |
| 8,714,780 B2 | 5/2014 | Ho et al. |
| 8,728,266 B2 | 5/2014 | Danner et al. |
| 8,743,077 B1 | 6/2014 | Sprague |
| 8,754,859 B2 | 6/2014 | Gates et al. |
| 8,797,258 B2 | 8/2014 | Sprague |
| 8,797,633 B1 | 8/2014 | Sprague et al. |
| 8,797,636 B2 | 8/2014 | Yang et al. |
| 8,830,560 B2 | 9/2014 | Danner et al. |
| 8,891,155 B2 | 11/2014 | Danner et al. |
| 8,928,562 B2 | 1/2015 | Gates et al. |
| 8,969,886 B2 | 3/2015 | Amundson |
| 9,025,234 B2 | 5/2015 | Lin |
| 9,025,238 B2 | 5/2015 | Chan et al. |
| 9,030,374 B2 | 5/2015 | Sprague et al. |
| 9,140,952 B2 | 9/2015 | Sprague et al. |
| 9,147,364 B2 | 9/2015 | Wu et al. |
| 9,152,003 B2 | 10/2015 | Danner et al. |
| 9,152,004 B2 | 10/2015 | Paolini, Jr. et al. |
| 9,201,279 B2 | 12/2015 | Wu et al. |
| 9,223,164 B2 | 12/2015 | Lai et al. |
| 9,279,906 B2 | 3/2016 | Kang |
| 9,285,648 B2 | 3/2016 | Liu et al. |
| 9,310,661 B2 | 4/2016 | Wu et al. |
| 9,419,024 B2 | 8/2016 | Amundson et al. |

(56) References Cited

U.S. PATENT DOCUMENTS

| | | |
|---|---|---|
| 9,454,057 B2 | 9/2016 | Wu et al. |
| 9,529,240 B2 | 12/2016 | Paolini, Jr. et al. |
| 9,582,041 B2 | 2/2017 | Cheng et al. |
| 9,620,066 B2 | 4/2017 | Bishop |
| 9,632,373 B2 | 4/2017 | Huang et al. |
| 9,666,142 B2 | 5/2017 | Hung |
| 9,671,635 B2 | 6/2017 | Paolini, Jr. |
| 9,778,500 B2 | 10/2017 | Gates et al. |
| 9,805,668 B2 | 10/2017 | Agostinelli et al. |
| 9,841,653 B2 | 12/2017 | Wu et al. |
| 10,037,735 B2 | 7/2018 | Amundson |
| 10,042,230 B2 | 8/2018 | Miyata |
| 10,048,563 B2 | 8/2018 | Paolini, Jr. et al. |
| 10,048,564 B2 | 8/2018 | Paolini, Jr. et al. |
| 10,190,743 B2 | 1/2019 | Hertel et al. |
| 10,276,109 B2 | 4/2019 | Crounse et al. |
| 10,444,553 B2 | 10/2019 | Laxton |
| 10,446,585 B2 | 10/2019 | Harris et al. |
| 10,466,564 B2 | 11/2019 | Kayal et al. |
| 10,475,396 B2 | 11/2019 | Sim et al. |
| 10,573,257 B2 | 2/2020 | Emelie et al. |
| 10,591,800 B2 | 3/2020 | Chiu et al. |
| 10,613,407 B2 | 4/2020 | Lin et al. |
| 10,679,571 B2 | 6/2020 | Chiu et al. |
| 11,151,951 B2 | 10/2021 | Lin et al. |
| 11,537,024 B2 * | 12/2022 | Lin .................. G02F 1/167 |
| 2002/0060321 A1 | 5/2002 | Kazlas et al. |
| 2004/0085619 A1 | 5/2004 | Wu et al. |
| 2004/0105036 A1 | 6/2004 | Danner et al. |
| 2005/0122306 A1 | 6/2005 | Wilcox et al. |
| 2005/0122563 A1 | 6/2005 | Honeyman et al. |
| 2006/0215106 A1 | 9/2006 | Kang et al. |
| 2006/0255322 A1 | 11/2006 | Wu et al. |
| 2007/0052757 A1 | 3/2007 | Jacobson |
| 2008/0094314 A1 | 4/2008 | Huitema et al. |
| 2009/0122389 A1 | 5/2009 | Whitesides et al. |
| 2009/0231268 A1 | 9/2009 | Yamada |
| 2009/0315044 A1 | 12/2009 | Amundson et al. |
| 2010/0177396 A1 | 7/2010 | Lin |
| 2010/0259524 A1 * | 10/2010 | Markvoort ............. G09G 3/344 |
| | | 345/211 |
| 2011/0102481 A1 | 5/2011 | Miyasaka et al. |
| 2011/0140744 A1 | 6/2011 | Kazlas et al. |
| 2011/0187683 A1 | 8/2011 | Wilcox et al. |
| 2011/0261042 A1 | 10/2011 | Umezaki |
| 2011/0292319 A1 | 12/2011 | Cole |
| 2014/0078024 A1 | 3/2014 | Paolini, Jr. et al. |
| 2014/0192000 A1 | 7/2014 | Hung et al. |
| 2014/0210701 A1 | 7/2014 | Wu et al. |
| 2015/0005720 A1 | 1/2015 | Zang et al. |
| 2016/0012710 A1 | 1/2016 | Lu et al. |
| 2016/0077375 A1 | 3/2016 | Lin |
| 2016/0225321 A1 * | 8/2016 | Sim .................. G09G 3/344 |
| 2020/0379312 A1 | 12/2020 | Wu et al. |

FOREIGN PATENT DOCUMENTS

| | | |
|---|---|---|
| JP | 2011141390 A | 7/2011 |
| JP | 2011150010 A | 8/2011 |
| JP | 2015184358 A | 10/2015 |
| KR | 20080040253 A | 5/2008 |
| WO | 1999067678 A2 | 12/1999 |
| WO | 2000005704 A1 | 2/2000 |
| WO | 2000038000 A1 | 6/2000 |

OTHER PUBLICATIONS

European Patent Office, "Extended European Search Report", EP Appl. No. 19906687.9, Aug. 4, 2022. Aug. 4, 2022.

* cited by examiner

ELECTRO-OPTIC DISPLAYS

REFERENCE TO RELATED APPLICATIONS

This application is a continuation of co-pending application Ser. No. 16/729,567, filed Dec. 30, 2019 (Publication No. 2020-0209703), which claims priority to U.S. Patent Application No. 62/786,437 filed on Dec. 30, 2018.

The entire disclosures of the aforementioned applications are incorporated herein by reference.

SUBJECT OF THE INVENTION

This invention relates to electro-optic display apparatuses, more particularly, to methods for driving electro-optic displays.

BACKGROUND OF INVENTION

Particle-based electrophoretic displays have been the subject of intense research and development for a number of years. In such displays, a plurality of charged particles (sometimes referred to as pigment particles) move through a fluid under the influence of an electric field. The electric field is typically provided by a conductive film or a transistor, such as a field-effect transistor. Electrophoretic displays have good brightness and contrast, wide viewing angles, state bistability, and low power consumption when compared with liquid crystal displays. Such electrophoretic displays have slower switching speeds than LCD displays, however, and electrophoretic displays are typically too slow to display real-time video. Additionally, the electrophoretic displays can be sluggish at low temperatures because the viscosity of the fluid limits the movement of the electrophoretic particles. Despite these shortcomings, electrophoretic displays can be found in everyday products such as electronic books (e-readers), mobile phones and mobile phone covers, smart cards, signs, watches, shelf labels, and flash drives.

Many commercial electrophoretic media essentially display only two colors, with a gradient between the black and white extremes, known as "grayscale." Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid. In the latter case, the first color is displayed when the first type of particles lie adjacent the viewing surface of the display and the second color is displayed when the second type of particles lie adjacent the viewing surface). Typically the two colors are black and white.

Although seemingly simple, electrophoretic media and electrophoretic devices display complex behaviors. For instance, it has been discovered that simple "on/off" voltage pulses are insufficient to achieve high-quality text in electronic readers. Rather, complicated "waveforms" are needed to drive the particles between states and to assure that the new displayed text does not retain a memory of the previous text, i.e., a "ghost." Furthermore, after being driven for a while, charges can built up in the electrophoretic media, sometimes referred to as the remnant voltage. Remnant voltage can damage the display over time and cause optical degradations to the electrophoretic media. As such, there is a need to reduce this remnant voltage in electrophoretic displays.

SUMMARY OF INVENTION

This invention provides a method for driving an electro-optic display, the display having at least one display pixel coupled to a storage capacitor, the method includes applying a waveform sequence to the at least one display pixel and connecting the storage capacitor to a first bias voltage, and maintaining a last frame voltage level on the display pixel after the completion of the applied waveform.

DETAILED DESCRIPTION

Figure 1:
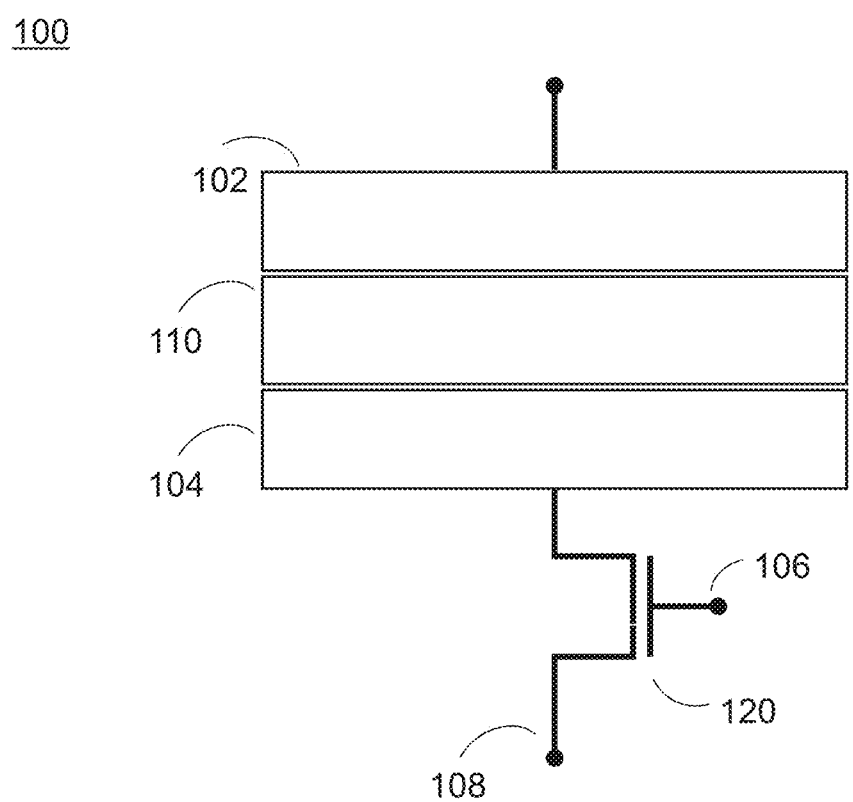
FIG. 1 illustrates an electrophoretic display in accordance with the subject matter disclosed herein.

As indicated above, the subject matter presented herein provides methods and means to reduce charge built up in the electrophoretic display medium and improve electro-optic display performances.

The term "electro-optic" as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published US Patent Application No. 2002/0180687 (see also the corresponding International Application Publication No. WO 02/079869) that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376, 828; 6,392,786; 6,413,790; 6,422,687; 6,445,374; 6,480,182; 6,498,114; 6,506,438; 6,518,949; 6,521, 489; 6,535,197; 6,545,291; 6,639,578; 6,657,772; 6,664,944; 6,680,725; 6,683,333; 6,724,519; 6,750, 473; 6,816,147; 6,819,471; 6,825,068; 6,831,769; 6,842,167; 6,842,279; 6,842,657; 6,865,010; 6,873, 452; 6,909,532; 6,967,640; 6,980,196; 7,012,735; 7,030,412; 7,075,703; 7,106,296; 7,110,163; 7,116, 318; 7,148,128; 7,167,155; 7,173,752; 7,176,880; 7,190,008; 7,206,119; 7,223,672; 7,230,751; 7,256, 766; 7,259,744; 7,280,094; 7,301,693; 7,304,780; 7,327,511; 7,347,957; 7,349,148; 7,352,353; 7,365, 394; 7,365,733; 7,382,363; 7,388,572; 7,401,758; 7,442,587; 7,492,497; 7,535,624; 7,551,346; 7,554, 712; 7,583,427; 7,598,173; 7,605,799; 7,636,191; 7,649,674; 7,667,886; 7,672,040; 7,688,497; 7,733, 335; 7,785,988; 7,830,592; 7,843,626; 7,859,637; 7,880,958; 7,893,435; 7,898,717; 7,905,977; 7,957, 053; 7,986,450; 8,009,344; 8,027,081; 8,049,947; 8,072,675; 8,077,141; 8,089,453; 8,120,836; 8,159, 636; 8,208,193; 8,237,892; 8,238,021; 8,362,488; 8,373,211; 8,389,381; 8,395,836; 8,437,069; 8,441, 414; 8,456,589; 8,498,042; 8,514,168; 8,547,628; 8,576,162; 8,610,988; 8,714,780; 8,728,266; 8,743, 077; 8,754,859; 8,797,258; 8,797,633; 8,797,636; 8,830,560; 8,891,155; 8,969,886; 9,147,364; 9,025, 234; 9,025,238; 9,030,374; 9,140,952; 9,152,003; 9,152,004; 9,201,279; 9,223,164; 9,285,648; and 9,310,661; and U.S. Patent Applications Publication Nos. 2002/0060321; 2004/0008179; 2004/0085619; 2004/0105036; 2004/0112525; 2005/0122306; 2005/ 0122563; 2006/0215106; 2006/0255322; 2007/ 0052757; 2007/0097489; 2007/0109219; 2008/ 0061300; 2008/0149271; 2009/0122389; 2009/ 0315044; 2010/0177396; 2011/0140744; 2011/ 0187683; 2011/0187689; 2011/0292319; 2013/ 0250397; 2013/0278900; 2014/0078024; 2014/ 0139501; 2014/0192000; 2014/0210701; 2014/ 0300837; 2014/0368753; 2014/0376164; 2015/ 0171112; 2015/0205178; 2015/0226986; 2015/ 0227018; 2015/0228666; 2015/0261057; 2015/ 0356927; 2015/0378235; 2016/077375; 2016/ 0103380; and 2016/0187759; and International Application Publication No. WO 00/38000; European Patents Nos. 1,099,207 B1 and 1,145,072 B1;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348;

(j) Non-electrophoretic displays, as described in U.S. Pat. No. 6,241,921; and U.S. Patent Applications Publication No. 2015/0277160; and U.S. Patent Application Publications Nos. 2015/0005720 and 2016/0012710.

All of the above patents and patent applications are incorporated herein by reference in their entireties.

Many of the aforementioned patents and applications recognize that the walls surrounding the discrete microcapsules in an encapsulated electrophoretic medium could be replaced by a continuous phase, thus producing a so-called polymer-dispersed electrophoretic display in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; inkjet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published U.S. Application No. 2002/0075556, both assigned to Sipix Imaging, Inc.

The aforementioned types of electro-optic displays are bistable and are typically used in a reflective mode, although as described in certain of the aforementioned patents and applications, such displays may be operated in a "shutter mode" in which the electro-optic medium is used to modulate the transmission of light, so that the display operates in a transmissive mode. Liquid crystals, including polymer-dispersed liquid crystals, are, of course, also electro-optic media, but are typically not bistable and operate in a transmissive mode. Certain embodiments of the invention described below are confined to use with reflective displays, while others may be used with both reflective and transmissive displays, including conventional liquid crystal displays.

Whether a display is reflective or transmissive, and whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed to that the next line of the display is written. This process is repeated so that the entire display is written in a row-by-row manner.

Processes for manufacturing active matrix displays are well established. Thin-film transistors, for example, can be fabricated using various deposition and photolithography techniques. A transistor includes a gate electrode, an insulating dielectric layer, a semiconductor layer and source and drain electrodes. Application of a voltage to the gate electrode provides an electric field across the dielectric layer, which dramatically increases the source-to-drain conductivity of the semiconductor layer. This change permits electrical conduction between the source and the drain electrodes. Typically, the gate electrode, the source electrode, and the drain electrode are patterned. In general, the semiconductor layer is also patterned in order to minimize stray conduction (i.e., cross-talk) between neighboring circuit elements.

Liquid crystal displays commonly employ amorphous silicon ("a-Si"), thin-film transistors ("TFT's") as switching devices for display pixels. Such TFT's typically have a bottom-gate configuration. Within one pixel, a thin film capacitor typically holds a charge transferred by the switching TFT. Electrophoretic displays can use similar TFT's with capacitors, although the function of the capacitors differs somewhat from those in liquid crystal displays; see the aforementioned copending application Ser. No. 09/565,413, and Publications 2002/0106847 and 2002/0060321. Thin film transistors can be fabricated to provide high performance. Fabrication processes, however, can result in significant cost.

In TFT addressing arrays, pixel electrodes are charged via the TFT's during a line address time. During the line address time, a TFT is switched to a conducting state by changing an applied gate voltage. For example, for an n-type TFT, a gate voltage is switched to a "high" state to switch the TFT into a conducting state.

Furthermore, unwanted effect such as voltage shifts may be caused by crosstalk occurring between a data line supplying driving waveforms to the display pixel and the pixel electrode. Similar to the voltage shift described above, crosstalk between the data line and the pixel electrode can be caused by capacitive coupling between the two even when the display pixel is not being addressed (e.g., associated pixel TFT in depletion). Such crosstalk can result in voltage shifts that are undesirable because it can lead to optical artifacts such as image streaking.

In some cases, an electrophoretic display or EPD may include two substrates (e.g., plastic or glass) where a front plane laminate or FPL is positioned between the two substrates. In some embodiments, the bottom portion of the top substrate may be coated with a transparent conductive material to function as a conductive electrode (i.e., the $V_{com}$ plane). The top portion of the lower substrate may include an array of electrode elements (e.g., conductive electrodes for each display pixels). A semiconductor switch, such as a thin film transistor or TFT, may be associated with each of these pixel electrodes. Application of a bias voltage to a pixel electrode and the $V_{com}$ plane may result in an electro-optical transformation of the FPL. This optical transformation can be used as a basis for the display of text or graphical information on the EPD. To display a desired image, a proper voltage needs to be applied to each pixel electrode.

FIG. 1 illustrates a schematic model of a display pixel 100 of an electro-optic display in accordance with the subject matter presented herein. Pixel 100 may include an imaging film 110. In some embodiments, imaging film 110 may be a layer of electrophoretic material and bistable in nature. This electrophoretic material may include a plurality of electrically charged color pigment particles (e.g., black, white, yellow or red) disposed in a fluid and capable of moving through the fluid under the influence of an electric field. In some embodiments, imaging film 110 may be an electrophoretic film having micro-cells with charged pigment particles. In some other embodiments, imaging film 110 may include, without limitation, an encapsulated electrophoretic imaging film, which may include, for example, charged pigment particles. It should be appreciated that the driving method presented below may be easily adopted for either types of electrophoretic material (e.g., encapsulated or film with micro-cells).

In some embodiments, imaging film 110 may be disposed between a front electrode 102 and a rear or pixel electrode 104. Front electrode 102 may be formed between the imaging film and the front of the display. In some embodiments, front electrode 102 may be transparent and light-transmissive. In some embodiments, front electrode 102 may be formed of any suitable transparent material, including, without limitation, indium tin oxide (ITO). Rear electrode 104 may be formed on an opposed side of the imaging film 110 to the front electrode 102. In some embodiments, a parasitic capacitance (not shown) may be formed between front electrode 102 and rear electrode 104.

Pixel 100 may be one of a plurality of pixels. The plurality of pixels may be arranged in a two-dimensional array of rows and columns to form a matrix, such that any specific pixel is uniquely defined by the intersection of one specified row and one specified column. In some embodiments, the matrix of pixels may be an "active matrix," in which each pixel is associated with at least one non-linear circuit element 120. The non-linear circuit element 120 may be coupled between back-plate electrode 104 and an addressing electrode 108. In some embodiments, non-linear element 120 may be a diode and/or a transistor, including, without limitation, a MOSFET or a Thin-Film Transistor (TFT). The drain (or source) of the MOSFET or TFT may be coupled to back-plate or pixel electrode 104, the source (or drain) of the MOSFET or TFT may be coupled to the addressing electrode 108, and the gate of the MOSFET or TFT may be coupled to a driver electrode 106 configured to control the activation and deactivation of the MOSFET or TFT. (For simplicity, the terminal of the MOSFET or TFT coupled to back-plate electrode 104 will be referred to as the MOSFET or TFT's drain, and the terminal of the MOSFET or TFT coupled to addressing electrode 108 will be referred to as the MOSFET or TFT's source. However, one of ordinary skill in the art will recognize that, in some embodiments, the source and drain of the MOSFET or TFT may be interchanged.)

In some embodiments of the active matrix, the addressing electrodes 108 of all the pixels in each column may be connected to a same column electrode, and the driver electrodes 106 of all the pixels in each row may be connected to a same row electrode. The row electrodes may be connected to a row driver, which may select one or more rows of pixels by applying to the selected row electrodes a voltage sufficient to activate the non-linear elements 120 of all the pixels 100 in the selected row(s). The column electrodes may be connected to column drivers, which may place upon the addressing electrode 106 of a selected (activated) pixel a voltage suitable for driving the pixel into a desired optical state. The voltage applied to an addressing electrode 108 may be relative to the voltage applied to the pixel's front-plate electrode 102 (e.g., a voltage of approximately zero volts). In some embodiments, the front-plate electrodes 102 of all the pixels in the active matrix may be coupled to a common electrode.

In use, the pixels 100 of the active matrix may be written in a row-by-row manner. For example, a row of pixels may be selected by the row driver, and the voltages corresponding to the desired optical states for the row of pixels may be applied to the pixels by the column drivers. After a preselected interval known as the "line address time," the selected row may be deselected, another row may be selected, and the voltages on the column drivers may be changed so that another line of the display is written.

Figure 2:
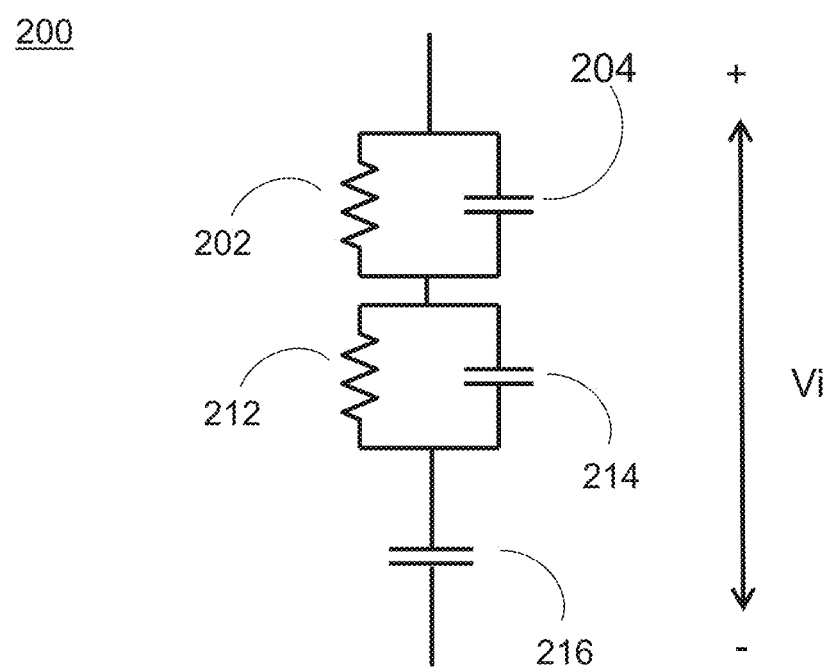
FIG. 2 illustrates an equivalent circuit of the electrophoretic display presented in FIG. 1 in accordance with the subject matter disclosed herein.

FIG. 2 illustrates a circuit model of the electro-optic imaging layer 110 disposed between the front electrode 102 and the rear electrode 104 in accordance with the subject matter presented herein. Resistor 202 and capacitor 204 may represent the resistance and capacitance of the electro-optic imaging layer 110, the front electrode 102 and the rear electrode 104, including any adhesive layers. Resistor 212 and capacitor 214 may represent the resistance and capacitance of a lamination adhesive layer. Capacitor 216 may represent a capacitance that may form between the front electrode 102 and the back electrode 104, for example, interfacial contact areas between layers, such as the interface between the imaging layer and the lamination adhesive layer and/or between the lamination adhesive layer and the back-plane electrode. A voltage Vi across a pixel's imaging film 110 may include the pixel's remnant voltage.

Figure 3:
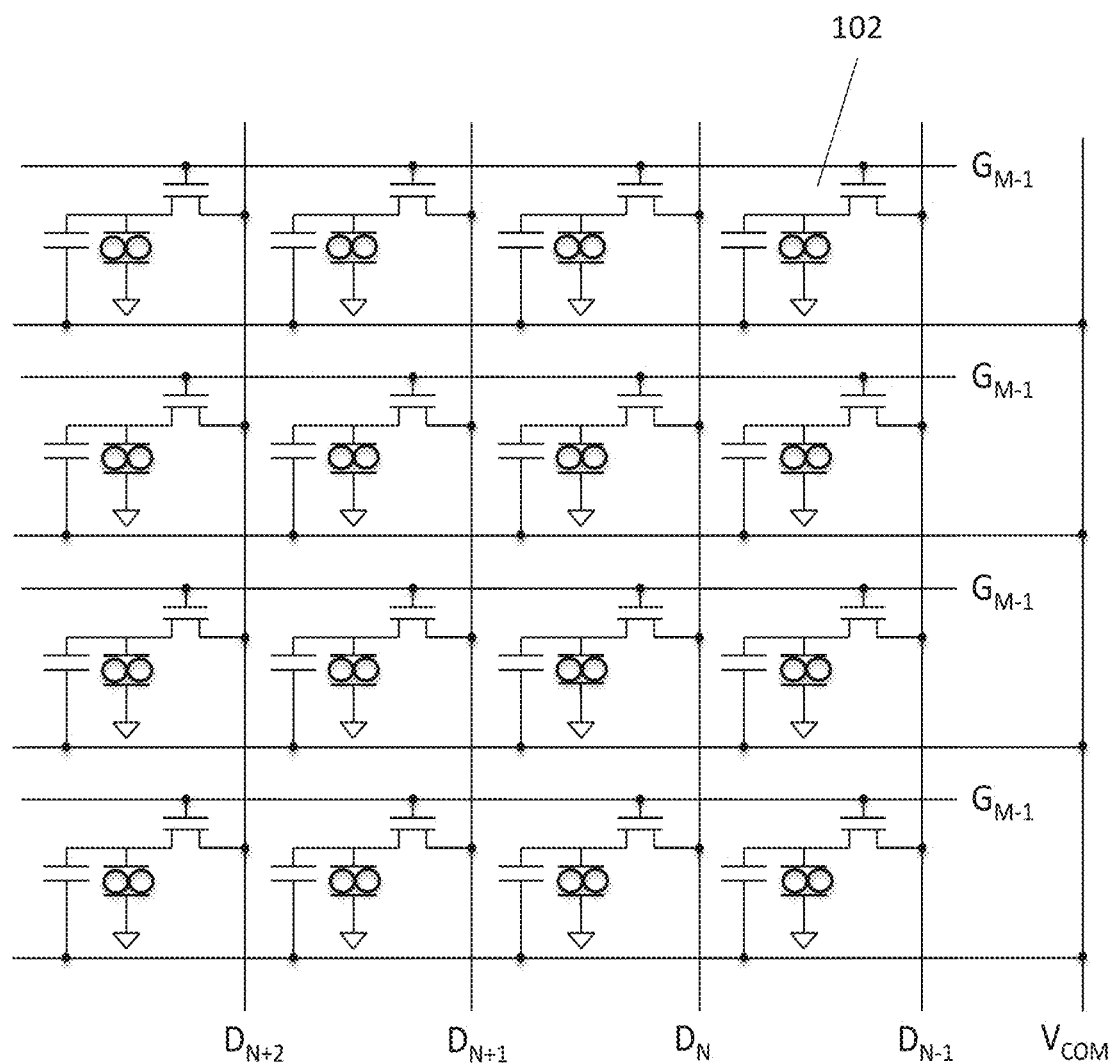
FIG. 3 illustrates an active matrix circuit in accordance with the subject matter disclosed herein.

FIG. 3 illustrates an exemplary active matrix for driving an electrophoretic display. In some embodiments, each display pixel of the electrophoretic display may be controlled by a thin-film-transistor (TFT). This TFT may be turned on and off to receive driving voltages to modulate optical states of the associated display pixel. To effectively control the driving of the associated display pixel, each TFT 102 as illustrated in FIG. 3 may be provided with a gate line signal, a data line signal, a $V_{com}$ line signal and a storage capacitor. In one embodiment, as illustrated in FIG. 1, the gate of each TFT 102 may be electrically coupled to a scan line, and the source or drain of the transistor may be connected to a data line, and the two terminals of the storage capacitor may be connected to a $V_{com}$ line and the pixel electrode, respectively. In some embodiments, the $V_{com}$ on the bottom portion of the top substrate and the $V_{com}$ line grid on the top portion of the bottom substrate may be connected to the same DC source.

Figure 4:
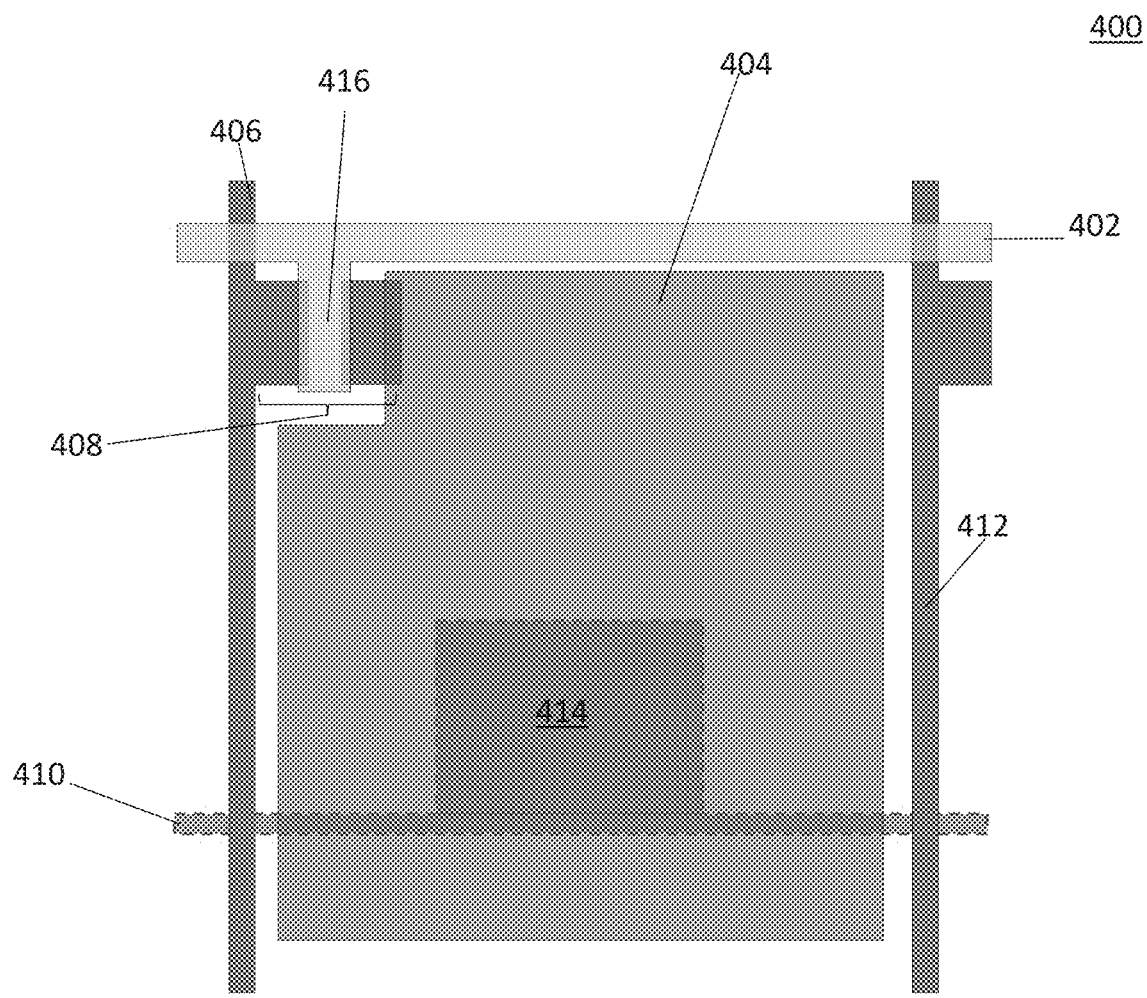
FIG. 4 illustrates schematic view of a display pixel in accordance with the subject matter presented herein.

FIG. 4 illustrates a top view of a display pixel 400 in accordance with the subject matter disclosed herein. The display pixel 400 includes a pixel electrode 404 configured to drive the display pixel. In use, the display pixel 400 will be driven by a series of voltage pulses induced onto the pixel electrode 404. The series of voltage pulses may be applied to the pixel electrode 204 through a transistor 408. The transistor 408 can function as a switch, switching on and off the signal path leading to the pixel electrode 404. For example, the gate 416 of the transistor 408 may be connected to a signal selecting gate line 402. In use, this gate 402 can be used to selectively turning on and off the transistor 408 by applying or not applying a voltage to the transistor's 408 gate 416. Furthermore, the series of voltage pulses may be supplied through a data line 406. This data line 406 is also electrically coupled to the transistor 408, as illustrated in FIG. 4. In operation, a signal (e.g., electrical pulse) can be transmitted through the gate line 402 to activate or turn-on the transistor 408, and once the transistor 408 is turned on, electrical signals applied through the data line 406 can be transmitted to the pixel electrode 404 through the transistor 408. Also presented in FIG. 4 is a $V_{com}$ line 410. In some embodiments, this $V_{com}$ line 410 may be electrically coupled to a top electrode (not shown here in FIG. 4) of the display to keep the top electrode at a constant voltage level (e.g., $V_{com}$). Normally this $V_{com}$ line 410 is at a device level positioned below the pixel electrode 404. Also connected to this $V_{com}$ line 410 is an electrode 414 of a storage capacitor, where the electrode 414 may be positioned on the same device layer as the $V_{com}$ line 40. In some embodiments, this storage capacitor may be the storage capacitor Cst 602 illustrated in FIG. 6 or Cst 902 illustrated in FIG. 9.

Figure 5:
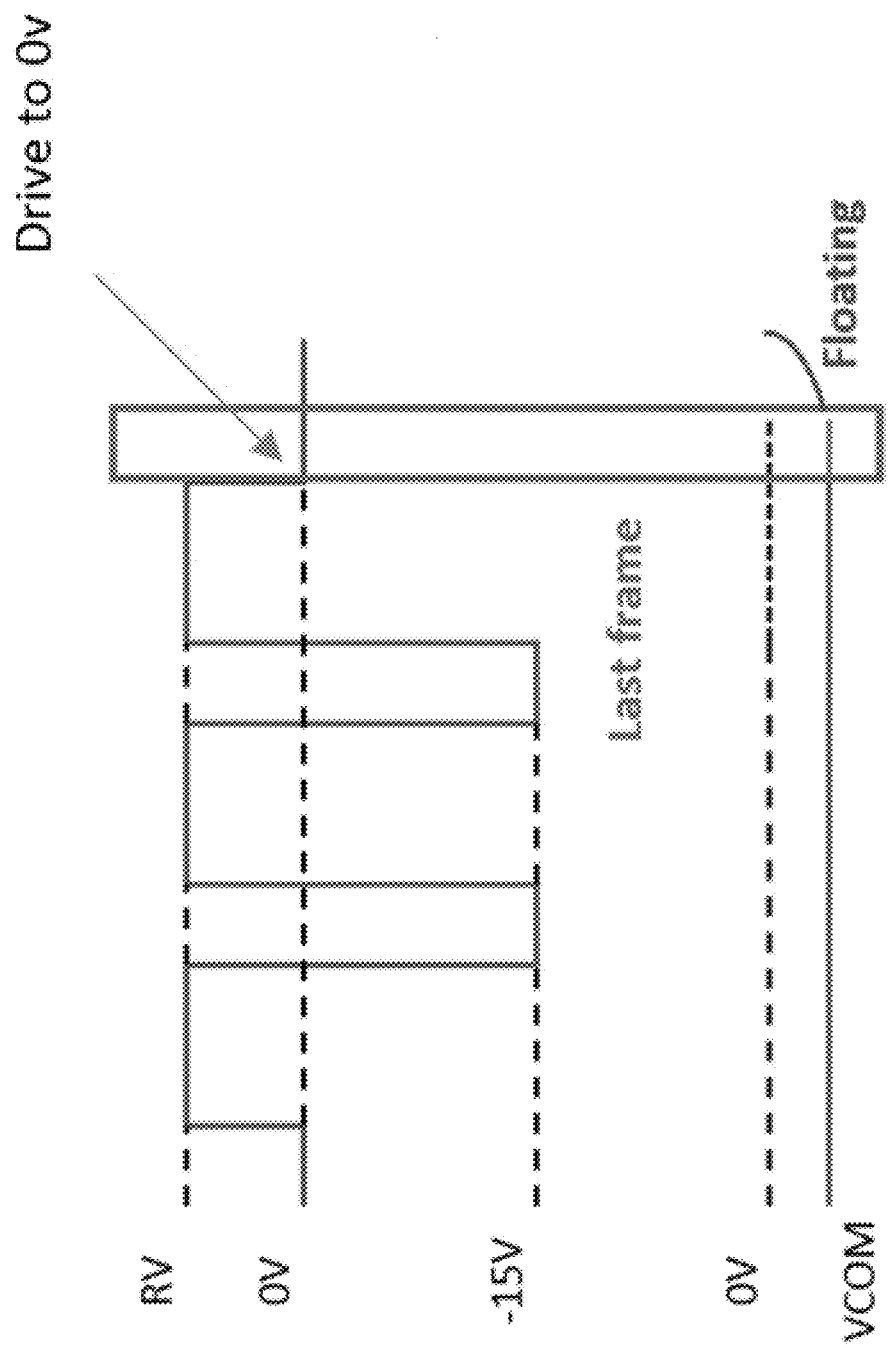
FIG. 5 illustrates one method to drive an electrophoretic display in accordance with the subject matter presented herein.
Figure 6:
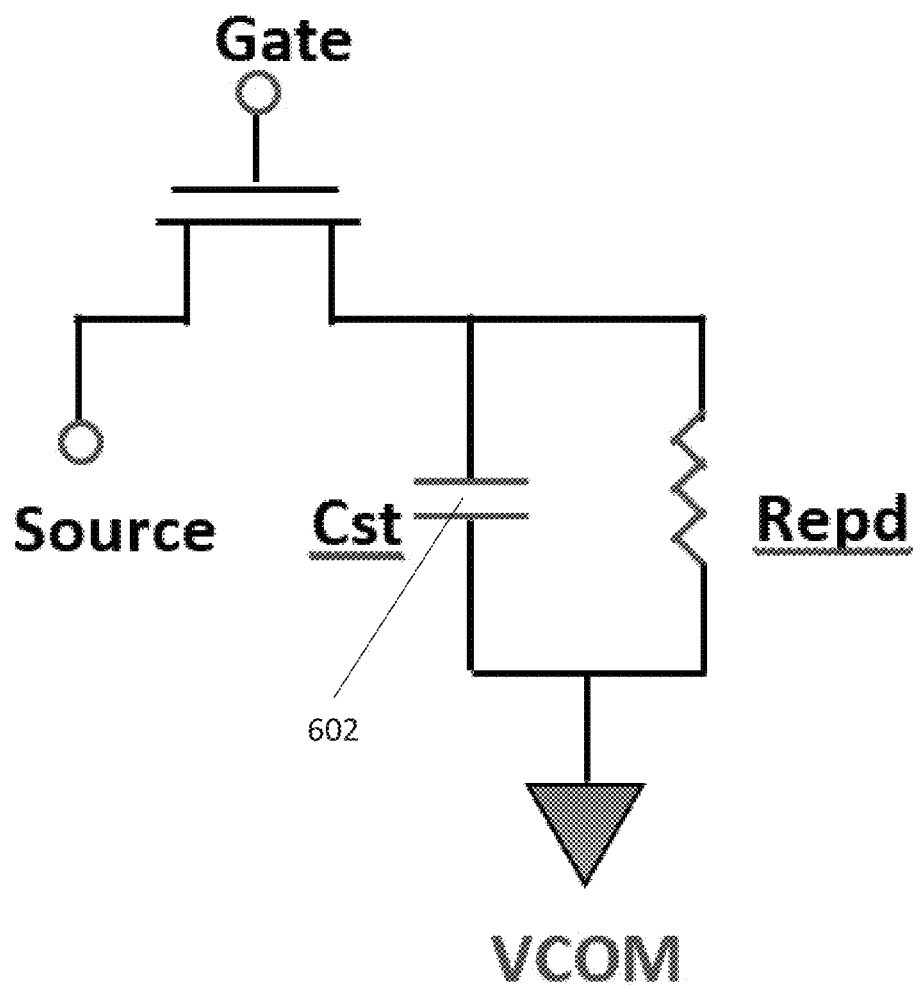
FIG. 6 illustrates one sample setup to drive an electrophoretic display in accordance with the subject matter presented herein.

FIG. 5 illustrates one way of driving an EPD. In this configuration, the storage capacitor or Cst and the EPD electrophoretic material layer, which is represented by its resistance Repd, are tied together to a constant voltage Vcom, as illustrated in FIG. 6. In operation, the waveform that drives a display pixel of the EPD may end with a 0V driving portion to discharge all the remaining voltages in the storage capacitor (i.e., Cst).

Figure 7:
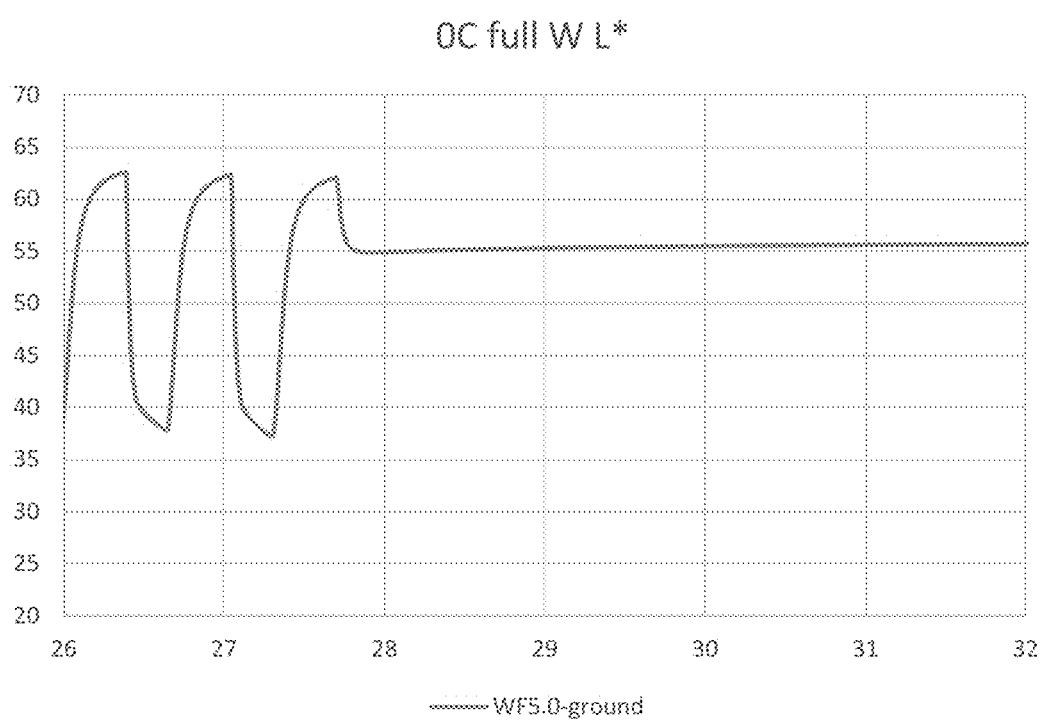
FIG. 7 is a diagram illustrating the variation in white state of a display in accordance with the subject matter presented herein.

However, in some cases, EPD modules may suffer from kickback voltages, which can lead to un-wanted variations or shifts in the optical quality of the EPD. FIG. 7 illustrates a plot showing the shifting of the white state of an EPD due to the kick back effect, where the kick back effect may be an effect experienced by the internal phase of the display due to an electric field equal and opposite to an initially applied field if, after complete polarization, the electrodes were both connected to ground (or brought to a common potential), which may result in an erasure of any image on the medium.

Referring now to FIG. 7, the end of the driving waveform or waveform sequence is around the time scale 27.7, where the L* of the white state decays instantly for around 8L*. What is illustrated in FIG. 7 is exactly at the time of FIG. 5 where the waveform changed to 0V driving.

Figure 8:
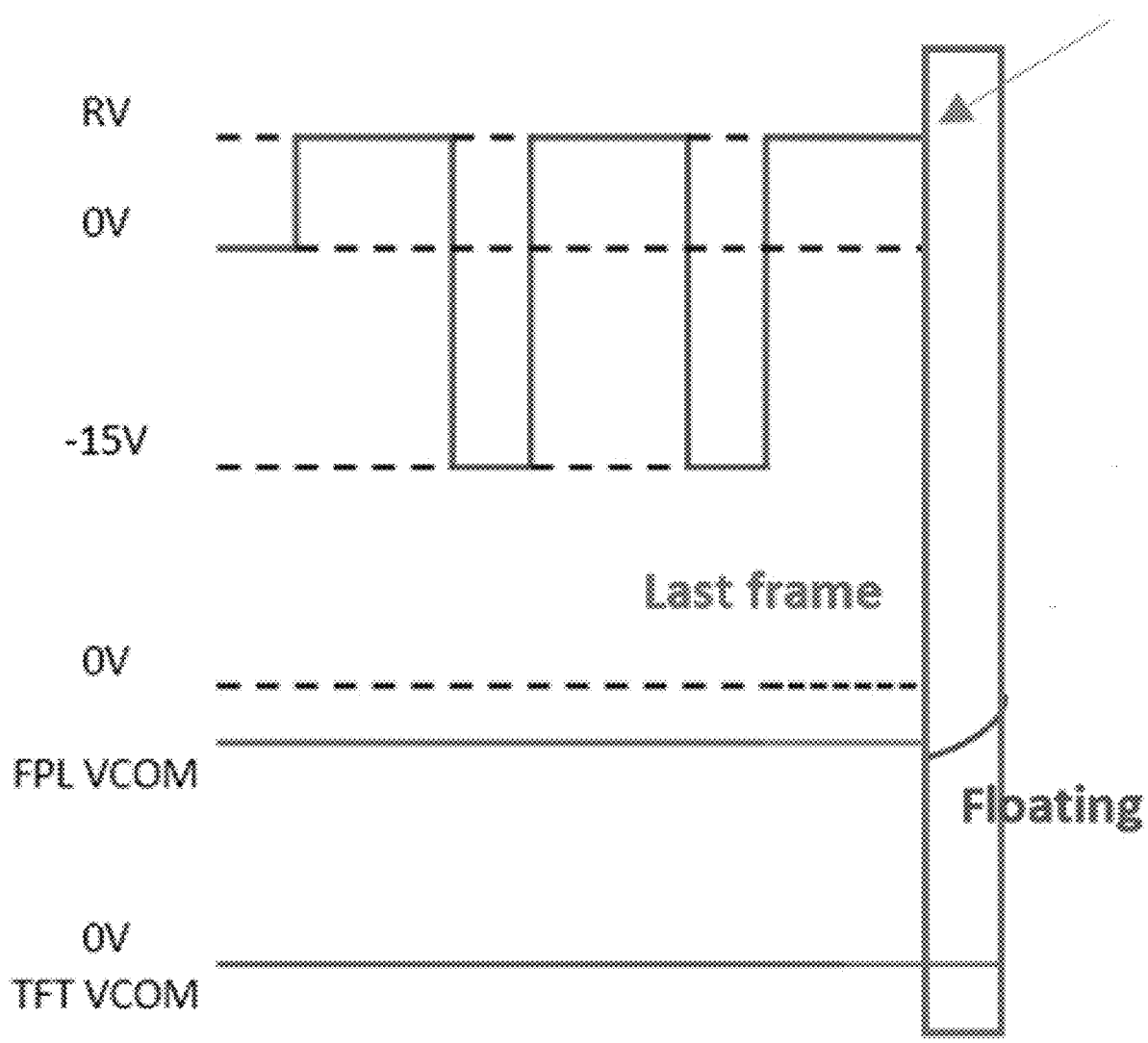
FIG. 8 illustrates another method to drive an electrophoretic display in accordance with the subject matter presented herein.
Figure 9:
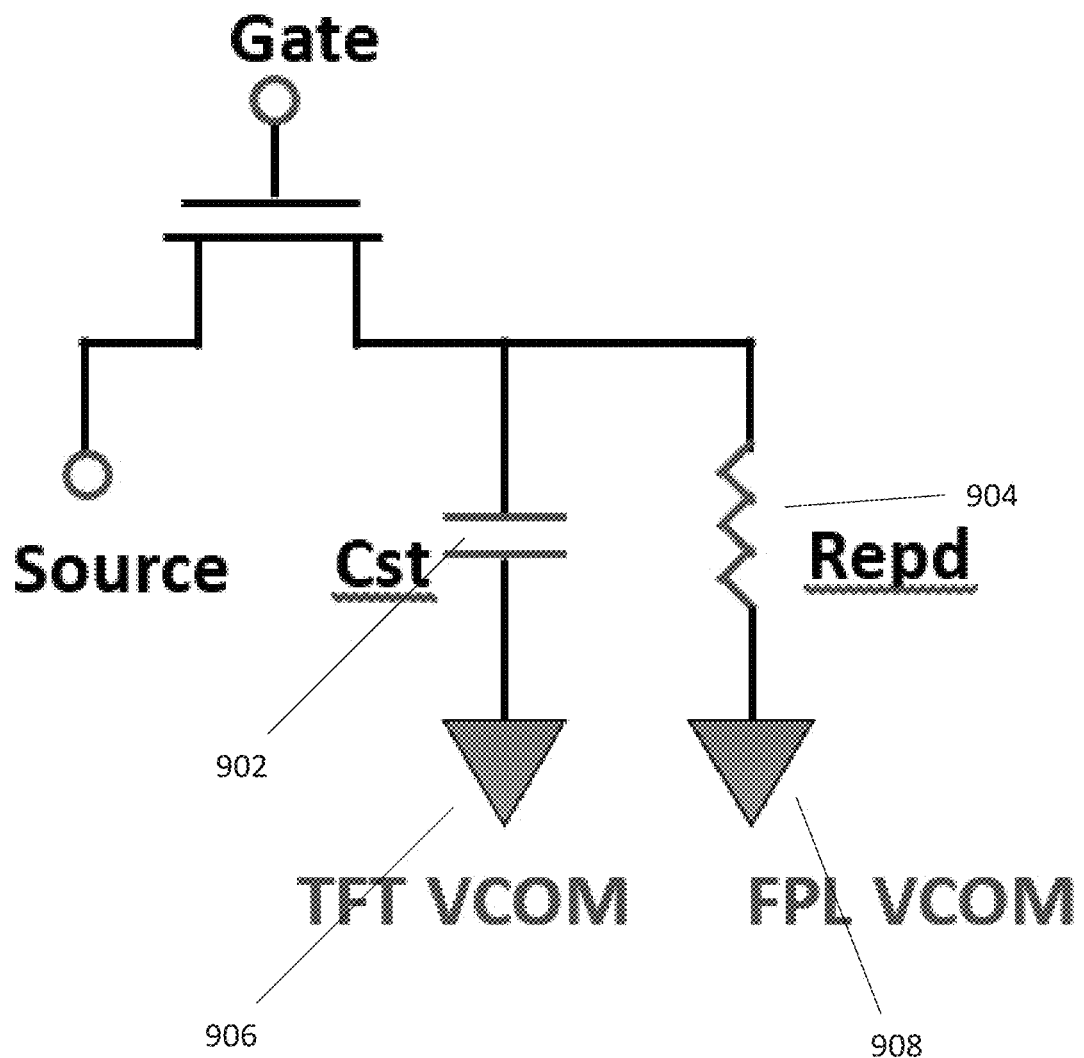
FIG. 9 illustrates another setup for driving an electrophoretic display in accordance with the subject matter presented herein.

Alternatively, as illustrated in FIGS. 8 and 9, the storage capacitor (i.e., Cst 902) and the EPD display medium layer (i.e., Repd 904) may be biased separately. For example, the storage capacitor Cst 902 may be biased by a Vcom line (e.g., TFT Vcom 906) similar to the Vcom line 410 illustrated in FIG. 4. While the display medium Repd 904 may be separately biased and controlled by a Vcom plane as mentioned above (e.g., FPL Vcom 908). Furthermore, at the end of a waveform driving sequence, instead of a period of zero volt driving, the source and gate of the associated TFT can be powered off. In other words, the display pixel may be kept at a voltage of the last frame of the waveform, or in a substantially floating state (i.e., a state where the pixel is substantially isolated or as if it is not connected to any conductive path). And the storage capacitor may be gradually discharged. In some embodiments, the FPL Vcom 908 may be configured to be placed in a floating state on the next frame. In some embodiments, in order to make sure there are small timing differences between the pixel and the Vcom control, the FPL Vcom 908 voltage may be set to float one frame prior to the waveform ending on the pixel. In some embodiments, the TFT Vcom 906 voltage is controlled differently and may be set to either zero volt or a DC voltage to ensure that the storage capacitor is charged properly. In some other embodiments, the TFT Vcom 906 may be configured to be floating, and the FPL Vcom 908 may be configured to be either floating or at a zero volt bias.

Alternatively, the TFT Vcom 906 and the FPL Vcom 908 voltages may be electrically coupled and programmed to be floating as the embodiment illustrated in FIG. 5.

In some embodiments, an electro-optic display as described herein may be driven by firstly applying a waveform sequence to the display's display pixels, connecting the storage capacitors associated with the display pixels to a first bias voltage such as the TFT Vcom voltage, and at the completion of a driving sequence, maintaining a last frame voltage level on the display pixels. Furthermore, at the end of the driving sequence, the storage capacitors may be kept floating, and the display's display medium may be kept floating, or at a zero volt bias.

Figure 10:
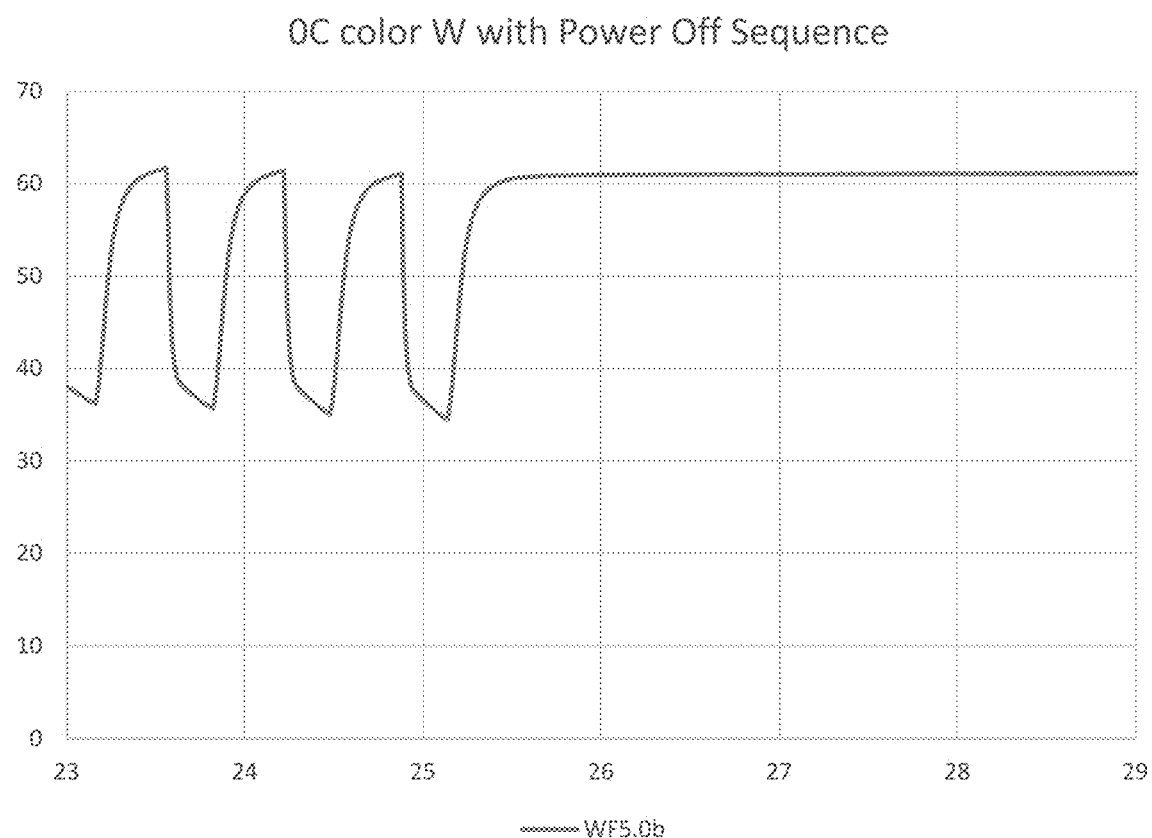
FIG. 10 is another diagram illustrating variation in white state of a display in accordance with the subject matter presented herein.

The driving method illustrated in FIG. 8 may be applied to some or all waveforms in a look up table (LUT). For example, if a LUT has black, white, red, and yellow states and therefore four waveforms, a designer may choose which waveform(s) may run the sequence described in FIG. 8. And they may end at the last frame of the LUT, where other waveforms that do not run this sequence will be needed to end at least one frame earlier to drive to zero volt. This driving sequence may eliminate or at least reduce the kick back effect. Where the optical trace line of the new sequence is illustrated in FIG. 10.

The invention claimed is:
1. An electro-optic display comprising:
an electrophoretic display medium disposed between a first common electrode and a display pixel electrode associated with a display pixel;
a storage capacitor coupled to the display pixel electrode at a first terminal of the storage capacitor;
a second common electrode coupled to a second terminal of the storage capacitor; and
a driver circuit in electrical communication with the first common electrode, the second common electrode, and a transistor associated with the display pixel electrode, the driver circuit capable of applying waveform sequences to the display pixel by applying one or more time-dependent voltages between the first common electrode and the display pixel electrode via the transistor, the driver circuit configured to:
apply a waveform sequence to the display pixel electrode to provide a driving voltage to the electrophoretic display medium between the display pixel electrode and the first common electrode,
apply a first bias voltage to the second common electrode during the waveform sequence, maintain a last frame voltage level on the display pixel electrode after the completion of the applied waveform sequence by placing the display pixel electrode and first common electrode in a floating state, and discharge the last frame voltage level on the display pixel electrode by discharging the storage capacitor through the second common electrode, wherein during the discharging step the first bias voltage applied to the second common electrode is zero volts.

2. The electro-optic display of claim 1 wherein the driver circuit is further configured to set the first common electrode and the second common electrode to the same voltage during the waveform sequence.

3. The electro-optic display of claim 1 wherein the first common electrode comprises a planar conductive material.

4. The electro-optic display of claim 1 wherein the second common electrode comprises a $V_{COM}$ line signal.

5. The electro-optic display of claim 1 wherein the driver circuit is further configured to place the first common electrode in a floating state one frame after the display pixel electrode when maintaining the last frame voltage level on the display pixel electrode.

6. The electro-optic display of claim 1 wherein the driver circuit is further configured to place the first common electrode in a floating state one frame prior to the display pixel electrode when maintaining the last frame voltage level on the display pixel electrode.

* * * * *